(12) United States Patent
Hinuma (10) Patent No.: US 10,930,447 B2
(45) Date of Patent: Feb. 23, 2021

(54) METHOD FOR POSITIONING INHIBITOR SWITCH

(71) Applicant: JATCO Ltd, Fuji (JP)

(72) Inventor: Syunsuke Hinuma, Isehara (JP)

(73) Assignee: JATCO LTD, Fuji (JP)

( * ) Notice: Subject to any disclaimer, the term of this patent is extended or adjusted under 35 U.S.C. 154(b) by 101 days.

(21) Appl. No.: 16/310,376

(22) PCT Filed: Apr. 11, 2017

(86) PCT No.: PCT/JP2017/014733
§ 371 (c)(1),
(2) Date: Dec. 14, 2018

(87) PCT Pub. No.: WO2017/217091
PCT Pub. Date: Dec. 21, 2017

(65) Prior Publication Data
US 2019/0333722 A1    Oct. 31, 2019

(30) Foreign Application Priority Data
Jun. 15, 2016    (JP) .............................. JP2016-118755

(51) Int. Cl.
*H01H 11/00* (2006.01)
*F16H 59/10* (2006.01)
*F16H 61/32* (2006.01)
*H01H 3/40* (2006.01)

(52) U.S. Cl.
CPC .......... *H01H 11/00* (2013.01); *F16H 59/105* (2013.01); *F16H 61/32* (2013.01); *H01H 3/40* (2013.01); *F16H 2061/326* (2013.01); *Y10T 29/4978* (2015.01); *Y10T 29/49464* (2015.01)

(58) Field of Classification Search
CPC .......... B23P 15/14; H01H 11/00; H01H 3/40; H01H 2300/02; F16H 59/105; F16H 61/32; F16H 2061/326; F16H 61/00; F16H 61/28; F16H 61/36; F16H 59/08;
(Continued)

(56) References Cited
U.S. PATENT DOCUMENTS 4,603,240 A * 7/1986 Hayasaki ............... H01H 21/34
  200/61.88
6,791,043 B2 * 9/2004 Watada ................. F16H 59/105
  200/61.88

FOREIGN PATENT DOCUMENTS

JP        8-74978 A    3/1996

* cited by examiner

*Primary Examiner* — Sarang Afzali
(74) *Attorney, Agent, or Firm* — Foley & Lardner LLP (57) ABSTRACT

An inhibitor switch is attached to a manual shaft with a jig. The jig includes a fitting part and an engagement pin. The fitting part is spline-fitted to an outer periphery of the manual shaft. The engagement pin engages in a positioning hole of the inhibitor switch. The outer periphery of the manual shaft includes a tooth-omitted part formed by omitting at least one of spline teeth. The fitting part includes an insertion hole. The insertion hole includes an inner periphery including internal teeth and an engaging part, wherein the internal teeth meshes with the spline teeth, and wherein the engaging part engages with the tooth-omitted part. The jig is attached to the manual shaft with the engaging part engaged with the tooth-omitted part. The inhibitor switch is rotated about the rotation axis to a position allowing engagement of the positioning hole with the engagement pin.

8 Claims, 6 Drawing Sheets

POSITIONING COMPLETED (58) Field of Classification Search
CPC ......... F16H 2061/283; Y10T 29/49778; Y10T 29/4978; Y10T 29/49464
See application file for complete search history.

POSITIONING COMPLETED

Prior Art

FIG. 6B

POSITIONING

Prior Art

METHOD FOR POSITIONING INHIBITOR SWITCH

CROSS-REFERENCE TO RELATED APPLICATIONS

This application is a National Phase of International Patent Application No. PCT/JP2017/014733 filed Apr. 11, 2017, which claims priority to Japanese Patent Application No. 2016-118755 filed Jun. 15, 2016. The contents of these applications are herein incorporated by reference in their entirety.

TECHNICAL FIELD

The present invention relates to a method for positioning an inhibitor switch.

BACKGROUND ART

A vehicular automatic transmission includes a manual shaft configured to be rotated about a rotation axis by operation of a shift lever, wherein an inhibitor switch is attached to the manual shaft and configured to output a signal indicative of a selected range of the automatic transmission.

The inhibitor switch includes: a movable member configured to rotate integrally with the manual shaft and support a movable contact; and a stationary member including a plurality of stationary contacts at a surface facing the movable contact. The inhibitor switch is configured such that as the manual shaft is rotated by operation of the shift lever, the movable contact moves circumferentially around the rotation axis, and thereby varies a combination of the stationary contacts in contact with the movable contact. The inhibitor switch is configured to output different signals depending on the combination of the stationary contacts in contact with the movable contact.

Attachment of the inhibitor switch is implemented by: (1) attaching the movable member to the manual shaft in a manner to prevent relative rotation therebetween when the manual shaft is held in a position of N-range; and thereafter (2) using a jig for positioning the stationary member in a specific position corresponding to the position of N-range, and then bolting the stationary member to a transmission case.

A patent document 1 discloses a jig for positioning an inhibitor switch.

Figure 6A:
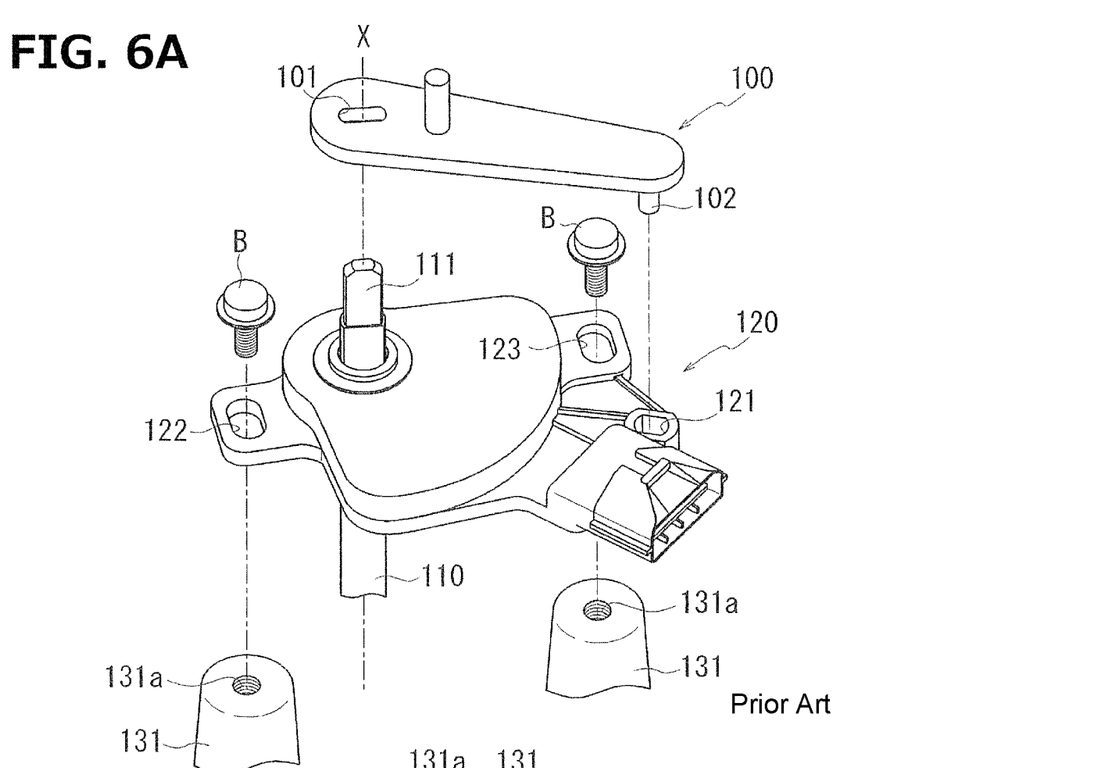
Figure 6B:
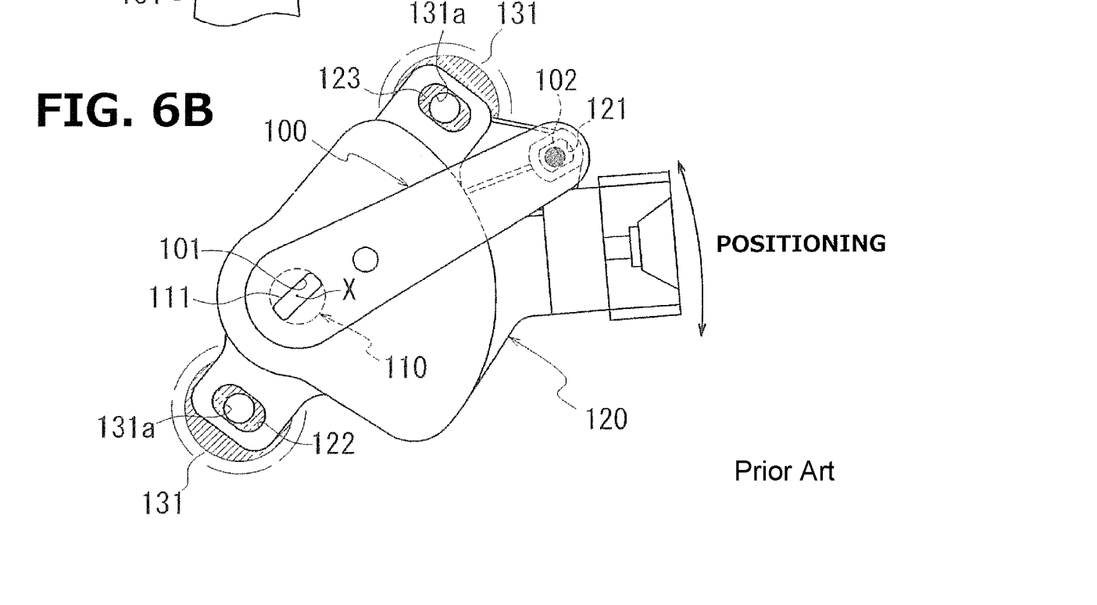

As shown in FIG. 6, patent document 1 discloses a positioning jig 100, which includes a first longitudinal end portion including a fitting hole 101 for fitting with a flat part 111 of a manual shaft 110, and a second longitudinal end portion including an engagement pin 102 for engagement with a positioning hole 121 formed in an inhibitor switch 120. Inhibitor switch 120 (stationary member) can be located correctly in a position corresponding to a position of N-range by: engaging the fitting hole 101 of jig 100 with flat part 111 of the manual shaft held in the position of N-range; and thereafter rotating the inhibitor switch 120 about a rotation axis X until engagement pin 102 of jig 100 engages in positioning hole 121 of inhibitor switch 120.

Under the condition where inhibitor switch 120 is placed correctly in the position corresponding to the position of N-range, the inhibitor switch 120 is fixed to the transmission case by insert bolts B through mounting holes 122, 123 of inhibitor switch 120, and screwing the bolts B in bolt holes 131a of bolt bosses 131 of the transmission case.

In this way, the conventional positioning of inhibitor switch 120 is based on use of flat part 111 of manual shaft 110 before manual shaft 110 is connected to a select lever.

The select lever is connected to a shift lever of a vehicle through a wire not shown, and is configured to be rotated about the rotation axis by operation of the shift lever. Accordingly, when the select lever is rotated about the rotation axis X by operation of the shift lever, the manual shaft, which is connected to the select lever, is also rotated bout the rotation axis X, to place a movable member of the inhibitor switch in an angular position about the rotation axis X which corresponds to a position of selection of the shift lever.

In recent years, various automatic transmissions have been proposed, which adopt an art (so-called shift-by-wire) where no wire and no select lever is provided, and a manual shaft is rotated by a motor depending on a selected range sensed by a sensor. In such a case, manual shaft 110 includes a first end portion formed with spline teeth instead of a flat part, wherein the spline teeth are configured to be in mesh with a motor-side gear. This prevents inhibitor switch 120 from being positioned with the conventional jig.

In view of the foregoing, it is requested to position an inhibitor switch suitably even when a manual shift includes spline teeth.

PRIOR ART DOCUMENT(S)

Patent Document(s)

Patent Document 1: JP H08-074978 A

SUMMARY OF THE INVENTION

According to the present invention, an inhibitor switch positioning method comprises: attaching an inhibitor switch to a manual shaft; using a jig for positioning the inhibitor switch, wherein the jig includes a fitting part and an engagement pin, wherein: the fitting part is structured to be spline-fitted to an outer periphery of the manual shaft; the engagement pin is structured to engage in a positioning hole formed in the inhibitor switch; and as viewed along a rotation axis of the manual shaft, the outer periphery of the manual shaft includes a tooth-omitted part formed by omitting at least one of a plurality of spline teeth arranged circumferentially at regular intervals, and the fitting part includes an insertion hole for insertion of the manual shaft, wherein the insertion hole includes an inner periphery including a plurality of internal teeth and an engaging part, wherein the internal teeth are structured to mesh with the spline teeth, and wherein the engaging part is structured to engage with the tooth-omitted part; attaching the jig to the manual shaft in a manner to prevent relative rotation between the jig and the manual shaft, with the engaging part engaged with the tooth-omitted part; and positioning the inhibitor switch by rotating the inhibitor switch about the rotation axis to a position allowing engagement of the positioning hole with the engagement pin arranged in a predetermined position.

When the jig is attached to the manual shaft in the manner to prevent relative rotation therebetween with the engaging part conformed to the tooth-omitted part under the condition that the manual shaft is held in the predetermined position for positioning, the engagement pin of the jig is always located in the same angular position as viewed along the rotation axis. Therefore, by using the engagement pin of the jig always located in the same angular position, for positioning the inhibitor switch circumferentially about the rotation axis under the condition that the inhibitor switch is supported by the manual shaft, it is possible to position the inhibitor switch always in the same angular position circumferentially about the rotation axis. This method can be used to position the inhibitor switch suitably when the manual shaft includes spline teeth.

BRIEF DESCRIPTION OF THE DRAWINGS

FIG. 1 (FIGS. 1A and 1B) is a diagram illustrating positioning of an inhibitor switch.

FIG. 2 (FIGS. 2A, 2B and 2C) is a diagram illustrating the inhibitor switch when the inhibitor switch is attached to a manual shaft.

FIG. 3 (FIGS. 3A, 3B and 3C) is a diagram illustrating a jig.

FIG. 4 (FIGS. 4A and 4B) is a diagram illustrating a spline of the manual shaft.

FIG. 5 (FIGS. 5A, 5B and 5C) is a diagram illustrating positioning of the inhibitor switch.

FIG. 6 (FIGS. 6A and 6B) is a diagram illustrating positioning of an inhibitor switch according to a conventional example.

DETAILED DESCRIPTION

The following describes an embodiment of the present invention with reference to an example of positioning of an inhibitor switch 4 of an automatic transmission adopting an art called steer-by-wire where a selected range of a shift lever not shown is sensed by a sensor not shown, and a manual shaft 2 is rotated by a motor not shown depending on the sensed range.

Figure 1A:
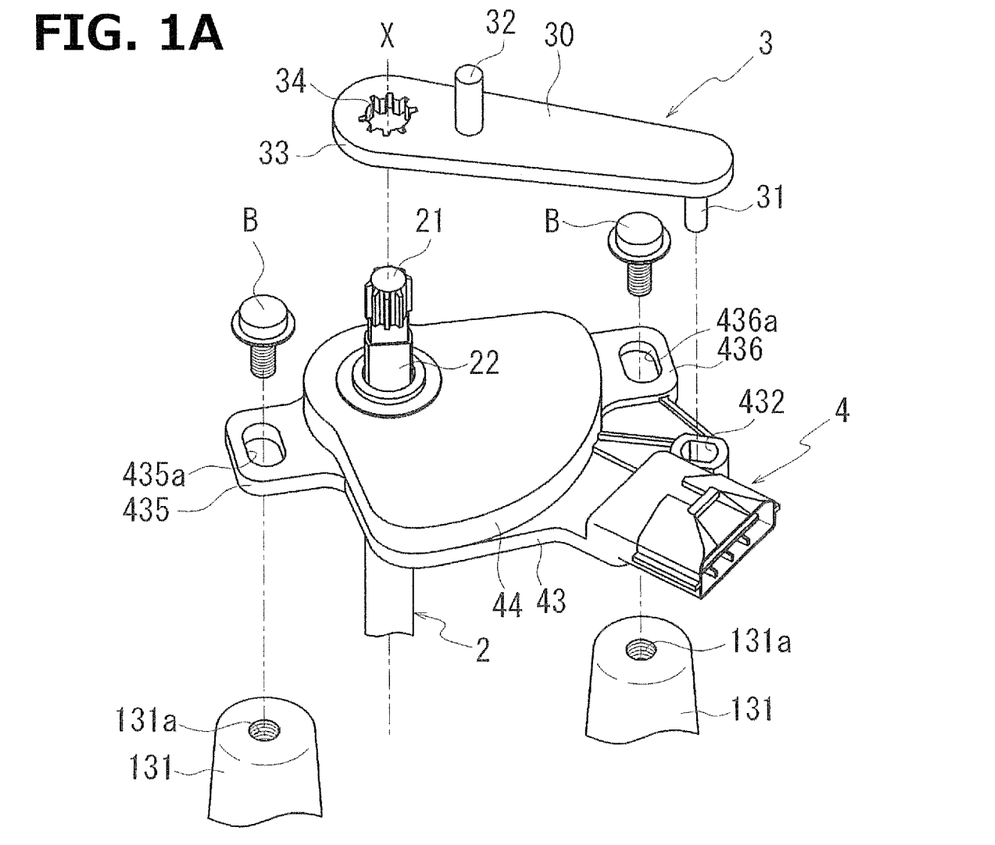
Figure 1B:
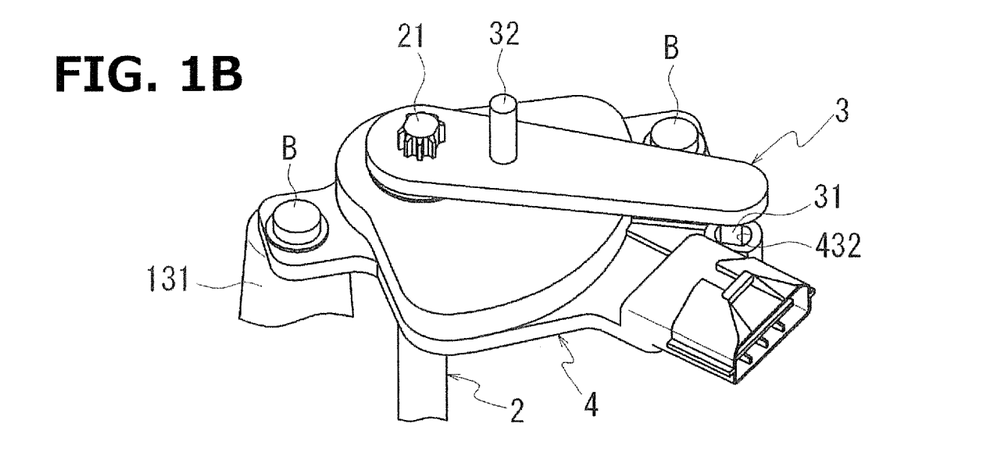
Figures 2A, 2B, 2C:
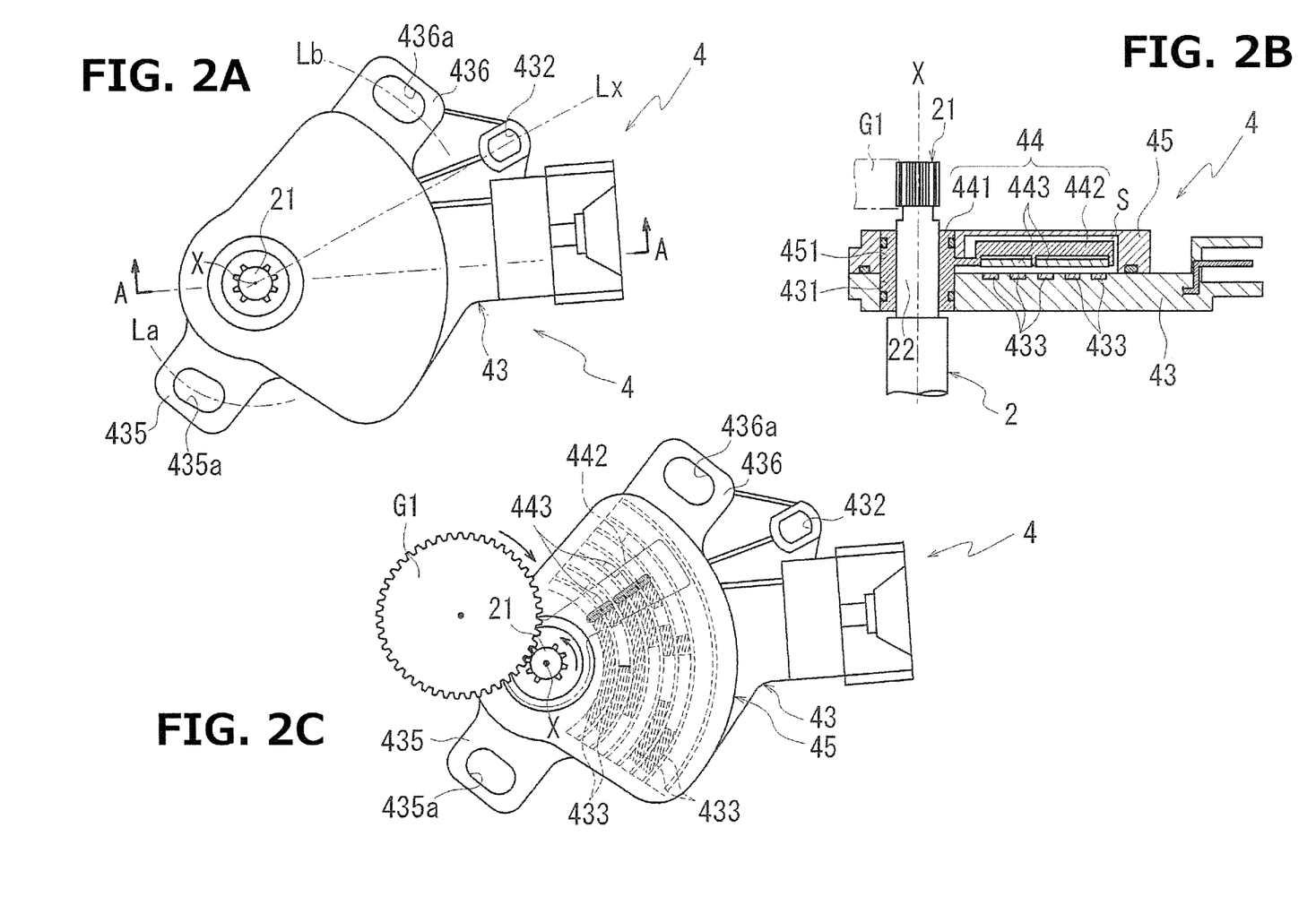

FIG. 1 is a diagram illustrating positioning of inhibitor switch 4 with a jig 3, where FIG. 1A is a perspective view before inhibitor switch 4 and manual shaft 2 are assembled with jig 3, and FIG. 1B is a perspective view after inhibitor switch 4 and manual shaft 2 are assembled with jig 3. FIG. 2 is a diagram illustrating the inhibitor switch 4 when inhibitor switch 4 is attached to manual shaft 2, where FIG. 2A is a plan view, FIG. 2B is a diagram schematically showing an A-A section in FIG. 2A, and FIG. 2C is a plan view showing the inhibitor switch 4 together with a gear G1 in mesh with a spline 21, where imaginary lines indicate positions of movable contacts 443 and stationary contacts 433 in inhibitor switch 4.

As shown in FIG. 1, manual shaft 2 of the automatic transmission adopting a shift-by-wire system includes a first longitudinal end portion including a spline 21 structured to mesh with gear G1 (see FIG. 2C). Gear G1 is a gear of a speed reduction gearset for transmitting output rotation of a motor not shown. Upon input of output rotation of the motor via the gear G1, manual shaft 2 rotates about a rotation axis X.

Manual shaft 2 includes a flat part 22 adjacent to spline 21, wherein a movable member 44 (see FIG. 2B) of inhibitor switch 4 is attached to flat part 22 in a manner to prevent relative rotation therebetween.

As shown in FIG. 2B, in inhibitor switch 4, movable member 44 is mounted in a space S formed between a base member 43 and a cover member 45, wherein movable member 44 is structured to rotate integrally with manual shaft 2. Movable member 44 so includes a support part 442 extending radially from a connecting part 441 connected to manual shaft 2, wherein movable contacts 443, 443 are provided at a surface of support part 442 facing the base member 43.

In a region of base member 43 facing the support part 442, a plurality of stationary contacts 433, 433, 433, 433 are exposed (see FIG. 2C), wherein each stationary contact 433 has an arc shape as viewed along the rotation axis X, and is apart from each other with a radial spacing about the rotation axis X, and has a different length circumferentially about the rotation axis X than each other. Accordingly, as manual shaft 2 is rotated about the rotation axis X by output rotation of the motor not shown, movable contacts 443 of movable member 44 move circumferentially about the rotation axis X, and thereby vary a combination of stationary contacts 433 connected to each other via the movable contacts 443.

The present embodiment is configured such that when manual shaft 2 rotates to an angular position corresponding to a selectable range (N-range, for example) of the shift lever, the combination of stationary contacts 433, 433 connected to each other via the movable contacts 443, 443 becomes equal to a combination corresponding to the N-range, so that inhibitor switch 4 outputs an output signal corresponding to the N-range.

Base member 43 includes mounting parts 435, 436 opposite to each other with respect to the region where stationary contacts 433, 433 are provided, wherein each mounting part 435, 436 includes a through hole 435a, 436a for insertion of a bolt B. As shown in FIG. 1, after being attached to manual shaft 2, inhibitor switch 4 is fixed to a transmission case by inserting the bolts B, B through the through holes 435a, 436a, and screwing the bolts B, B into bolt holes 131a of bolt bosses 131 of the transmission case.

The attachment of inhibitor switch 4 to manual shaft 2 is carried out when manual shaft 2, which projects from the transmission case not shown, is placed in an angular position corresponding to the N-range.

Movable member 44, which is attached to manual shaft 2 in a manner to prevent relative rotation therebetween, is rotatably supported at through holes 431, 451 (see FIG. 2B) extending through the base member 43 and cover member 45 of inhibitor switch 4. Accordingly, if movable member 44 attached to manual shaft 2 deviates circumferentially about the rotation axis X with respect to base member 43 when inhibitor switch 4 is attached to manual shaft 2, the combination of stationary contacts 433, 433 connected to each other via movable contacts 443, 443 may become different from the combination corresponding to the N-range.

In such a case, even if manual shaft 2 is placed in the angular position corresponding to the N-range when inhibitor switch 4 is attached to manual shaft 2, the output signal of inhibitor switch 4 may become a signal indicative of a range different from the N-range. In view of the foregoing, the present embodiment is configured such that when inhibitor switch 4 is attached to manual shaft 2, the special jig 3 is used to position the base member 43 circumferentially about the rotation axis X, and conform the combination of stationary contacts 433, 433 connected to each other via movable contacts 443, 443 to the combination corresponding to the N-range.

Figures 3A, 3C:
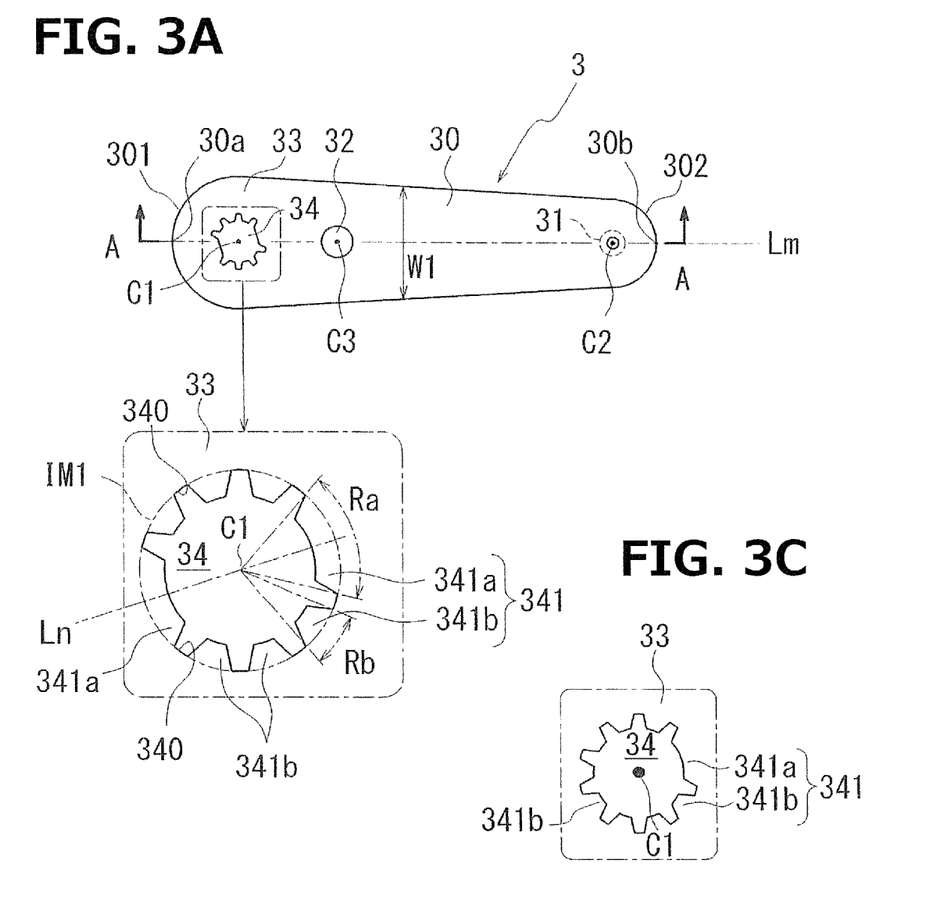
Figure 3B:
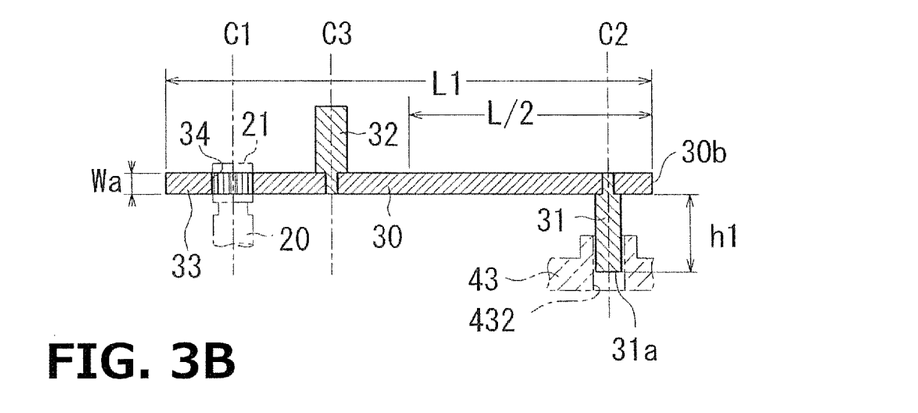
Figure 4A:
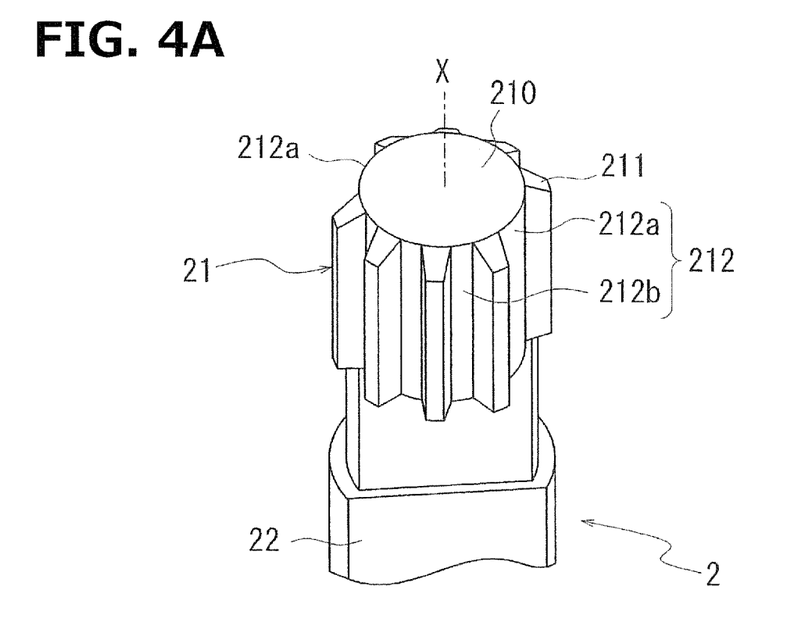
Figure 4B:
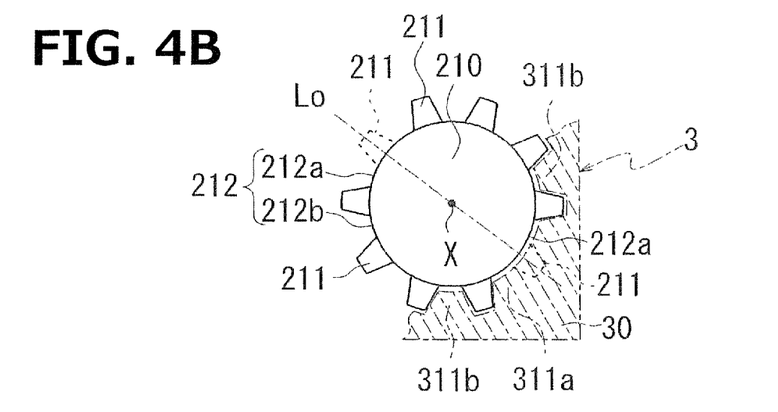

The following describes jig 3 for positioning the inhibitor switch 4 (base member 43). FIG. 3 is a diagram illustrating the jig 3 according to the present embodiment, where FIG. 3A is a plan view of jig 3, FIG. 3B schematically shows an A-A section in FIG. 3A, and FIG. 3C shows a shape of fitting hole 34 according to a modified example. FIG. 4 is a diagram illustrating the spline 21 which engages in fitting hole 34 of jig 3, where FIG. 4A is a perspective view of an end portion of manual shaft 2 including the spline 21, and FIG. 4B is a plan view of spline 21 of manual shaft 2 as viewed along the rotation axis, where an imaginary line represents a part of fitting hole 34 of jig 3 structured to mesh with spline 21.

As shown in FIG. 3, jig 3 includes a base part 30 having a plate shape. In plan view, base part 30 has an outside shape whose width W1 narrows from a first end 30a to a second end 30b in a longitudinal direction. The first end 30a and second end 30b of base part 30 are curved such that first end 30a includes an outer periphery 301 having an arc shape about a center C1 on an imaginary line Lm passing through a center of base part 30 in a width direction, and second end 30b also includes an outer periphery 302 having an arc shape about a center C2 on the imaginary line Lm. Base part 30 is made of a metal material having a high rigidity, having a thickness Wa that is constant over an overall length L1 in the longitudinal direction.

In plan view, an engagement pin 31 is fixed to a portion of base part 30 closer to the second end 30b and overlapping with the center C2, wherein engagement pin 31 has a cylindrical shape, and extends perpendicular to base part 30. Engagement pin 31 has a height h1 with respect to base part 30, wherein height h1 is set such that when inhibitor switch 4 is positioned with jig 3, a distal end 31a of engagement pin 31 is allowed to be inserted in a positioning hole 432 formed in base member 43 of inhibitor switch 4. Positioning hole 432 is formed to extend through the base member 43 in its thickness direction. Under a condition that inhibitor switch 4 is attached to manual shaft 2, positioning hole 432 has an elliptical shape extending along an imaginary line Lx (see FIG. 2A) extending radially from the rotation axis X.

As shown in FIG. 3, jig 3 includes a grasp part 32 in a position apart from engagement pin 31 toward first end 30a of base part 30, wherein grasp part 32 has a cylindrical shape. Grasp part 32 is positioned between first end 30a and a central part (L/2) in the longitudinal direction of base part 30. Grasp part 32 is a projection to be grasped by a user during use of jig 3, and projects from a surface of base part 30 opposite to engagement pin 31.

A part of base part 30 between grasp part 32 and first end 30a is a fitting part 33 formed with a fitting hole 34 as shown in the plan view, wherein fitting hole 34 is structured to engage with spline 21 of manual shaft 2, and pass through the base part 30 in the thickness direction. In the plan view, fitting hole 34 has a center C1 that is identical to the center C1 of the arc of outer periphery 301, and has a hole edge (inner periphery 340) located on an imaginary line IM1 surrounding the center C1 with a predetermined spacing.

The inner periphery 340 of fitting hole 34 includes a plurality of engaging projections 341 (341a, 341b) arranged circumferentially at intervals. Engaging projections 341 serve as engaging parts structured to engage with spline teeth 211 of manual shaft 2 described below.

In the present embodiment, engaging projections 341 include engaging projections (engaging parts) 341a and engaging projections (internal teeth) 341b, wherein each engaging projection 341a has a wider angular range Ra about the center C1, and each engaging projection 341b has a narrower angular range Rb than engaging projections 341a. Engaging projections 341a, 341a are located opposite to each other and on a center line Ln of fitting hole 34 passing through the center C1. Engaging projections 341b are arranged circumferentially at regular intervals between engaging projections 341a, 341a adjacent in the circumferential direction.

The number and location of engaging projections 341a, 341a are set in conformance with the shape of spline 21 of manual shaft 2 which engages in fitting hole 34. In the present embodiment, the number and location of engaging projections 341a, 341a are set such that when fitting hole 34 of jig 3 is engaged with spline 21 at the rotation axis X of manual shaft 2, engagement pin 31 of jig 3 is located in a predetermined position in the circumferential direction about the rotation axis X.

Specifically, the location of engagement pin 31 when jig 3 is attached to manual shaft 2 is set such that when jig 3 is attached to manual shaft 2 placed in the N-range, and base member 43 of inhibitor switch 4 is placed in an angular position about the rotation axis X where engagement pin 31 of jig 3 engages in positioning hole 432 of base member 43, the combination of stationary contacts 433 connected to each other via the movable contacts 443, 443 becomes equal to the combination corresponding to the N-range.

Spline 21, which engages in fitting hole 34 of jig 3 when jig 3 is attached to manual shaft 2, includes a cylindrical base part 210 including spline teeth 211 at an outer periphery, as shown in FIG. 4. Spline teeth 211 are arranged at regular intervals in the circumferential direction about the rotation axis X, wherein as viewed along the rotation axis X, two spline teeth 211 located on a center line Lo of base part 210 passing through the rotation axis X are omitted in the present embodiment. Accordingly, the outer periphery of base part 210 includes a tooth space 212a (tooth-omitted part) having a wide angular range in the circumferential direction about the rotation axis X, and a tooth space 212b having a narrower angular range in the circumferential direction than tooth spaces 212a. Tooth spaces 212a are arranged at intervals of 180 degrees in the circumferential direction about the rotation axis X.

If spline 21 has regular intervals entirely in the circumferential direction about the rotation axis, spline 21 provides no reference for confirmation of the angular position of the manual shaft 2 about the rotation axis. Accordingly, even when manual shaft 2 is placed in the angular position corresponding to the N-range, it is impossible to determine whether orientation of jig 3 is correct for engagement with spline 21.

In view of the foregoing, in the present embodiment, for providing a reference for confirmation of the angular position of the manual shaft 2 about the rotation axis, base part 210 is provided with tooth spaces 212a formed by omitting the spline teeth 211, and the inner periphery 340 of fitting hole 34 of jig 3 is provided with engaging projections 341a which engage in tooth spaces 212a, so that when jig 3 is attached to spline 21, engagement pin 31 of jig 3 is always placed in the predetermined position in the circumferential direction about the rotation axis X.

The following describes an operation of attachment of inhibitor switch 4 to manual shaft 2. FIG. 5 is a diagram illustrating positioning of inhibitor switch 4 with jig 3. In FIG. 5, the position of engagement pin 31, which is on the hidden side of base part 30 of jig 3 in FIG. 5, is represented by hatching pattern. The part of inhibitor switch 4 hidden by jig 3 is represented by imaginary lines.

Before inhibitor switch 4 is attached to manual shaft 2, manual shaft 2 has a first end portion formed with spline 21, which projects from the transmission case to the outside. Under this condition, manual shaft 2 is placed in the angular position about the rotation axis X which corresponds to the N-range.

When inhibitor switch 4 is attached to manual shaft 2 by inserting the first end portion of manual shaft 2 formed with spline 21 into inhibitor switch 4, and attaching the movable member 44 of inhibitor switch 4 to the flat part 22 of manual shaft 2 in the manner to prevent relative rotation therebetween, spline 21 of manual shaft 2 is placed to project upward from the cover member 45 of inhibitor switch 4.

Under this condition, base member 43 and cover member 45 of inhibitor switch 4 can move in the circumferential direction about the rotation axis X. As the angular position of base member 43 about the rotation axis X varies, the combination of stationary contacts 433 connected to each other via movable contacts 443, 443 varies depending on the position of base member 43.

Since manual shaft 2 is held in the position of N-range, it is required to adjust the angular position of base member 43 about the rotation axis X such that the combination of stationary contacts 433 connected to each other via movable contacts 443, 443 indicates the N-range, and the output signal of inhibitor switch 4 indicates the N-range.

When fitting hole 34 of jig 3 is engaged with spline 21 of manual shaft 2 placed in the position of N-range, engagement pin 31 of jig 3 is placed in the predetermined position in the circumferential direction about the rotation axis X as described above (see FIG. 5). The predetermined position of engagement pin 31 in the circumferential direction about the rotation axis X under this condition is set such that when positioning hole 432 of base member 43 is engaged with engagement pin 31, the combination of stationary contacts 433 connected to each other via movable contacts 443, 443 corresponds to the N-range.

Figure 5A:
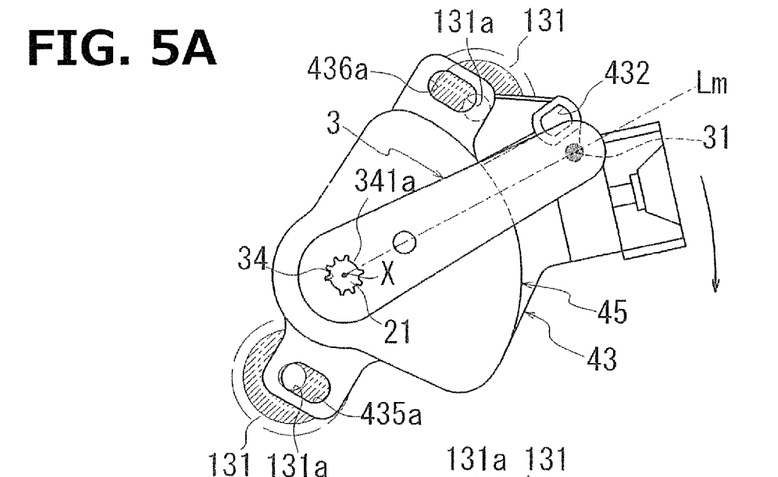
Figures 5B, 5C:
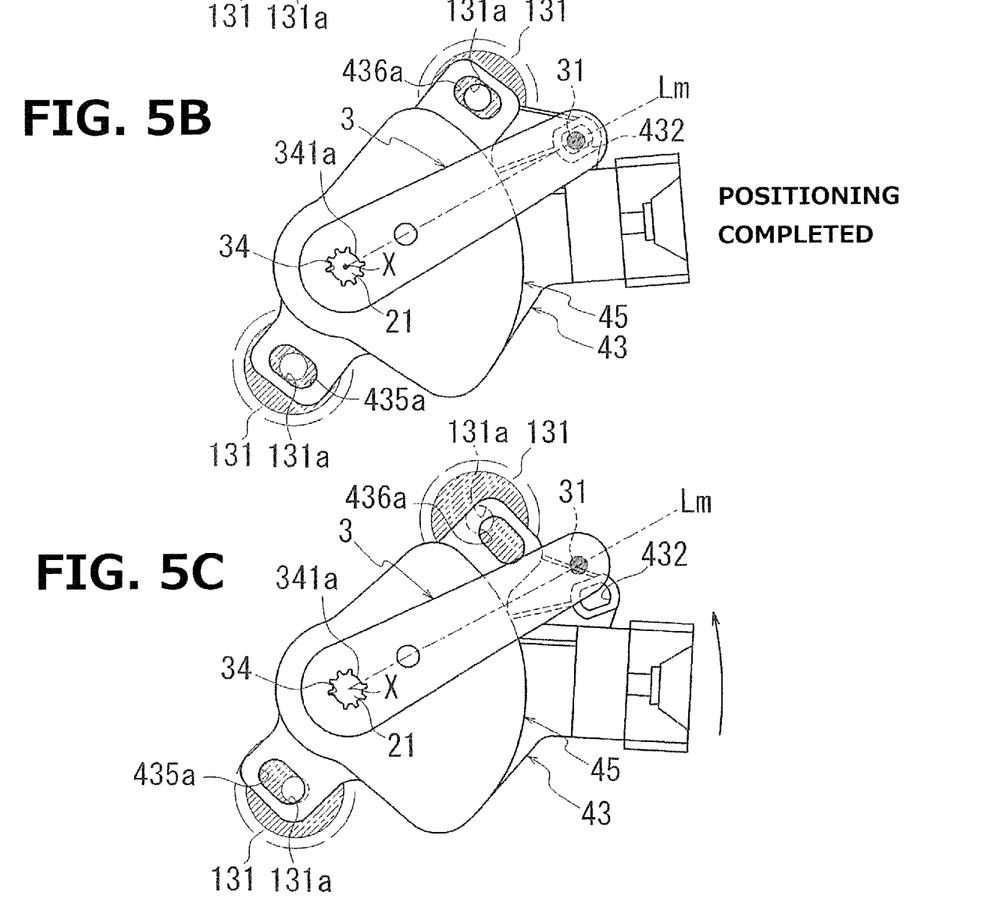

Accordingly, in a situation shown in FIG. 5A, base member 43 of inhibitor switch 4 is rotated in the clockwise direction about the rotation axis X to the angular position shown in FIG. 5B where engagement pin 31 conforms to positioning hole 432, to position the inhibitor switch 4 such that the output signal of inhibitor switch 4 indicates the N-range.

On the other hand, in a situation shown in FIG. 5C, base member 43 of inhibitor switch 4 is rotated in the counterclockwise direction about the rotation axis X to the angular position shown in FIG. 5B where engagement pin 31 conforms to positioning hole 432, to position the inhibitor switch 4 such that the output signal of inhibitor switch 4 indicates the N-range.

Each of through holes 435a, 436a of mounting parts 435, 436 of inhibitor switch 4 for bolts B is formed to have an elliptical shape extending along an imaginary circle La, Lb in the circumferential direction about the rotation axis X (see FIG. 2A). Accordingly, even if base member 43 is rotated about the rotation axis X within a range of error with respect to the position shown in FIG. 5B, bolt holes 131a, 131a of bolt bosses 131, 131 are constantly exposed inside of through holes 435a, 436a.

This allows to insert the bolts B, B through the through holes 435a, 436a, and screw the bolts B, B into bolt holes 131a, 131a, after base member 43 of inhibitor switch 4 is moved and positioned around the rotation axis X, and thereby hold the inhibitor switch 4 in the predetermined position obtained by the positioning.

As described above, the present embodiment is configured as follows.

<1> An inhibitor switch positioning method includes: attaching an inhibitor switch (4) to a manual shaft (2); using a jig (3) for positioning the inhibitor switch (4), wherein the jig (3) includes a fitting part (33) and an engagement pin (31), wherein: the fitting part (33) is structured to be spline-fitted to an outer periphery of the manual shaft (2); the engagement pin (31) is structured to engage in a positioning hole (432) formed in the inhibitor switch (4); and as viewed along a rotation axis (X) of the manual shaft (2), the outer periphery of base part (210) of the manual shaft (2) includes a tooth space (212a, tooth-omitted part) formed by omitting at least one of a plurality of spline teeth (211) arranged circumferentially at regular intervals, and the fitting part (33) includes a fitting hole (34) for insertion of the manual shaft (2), wherein the fitting hole (34) includes an inner periphery including a plurality of engaging projections (341b, internal teeth) and an engaging projection (341a, engaging part), wherein the engaging projections (341b, internal teeth) are structured to mesh with the spline teeth (211), and wherein the engaging projection (341a, engaging part) is structured to engage in the tooth space (212a); attaching the jig (3) to the manual shaft (2) in a manner to prevent relative rotation between the jig (3) and the manual shaft (2), with the engaging projection (341a, engaging part) engaged in the tooth space (212a); positioning the inhibitor switch (4) by rotating the inhibitor switch (4) about the rotation axis (X) to a position allowing engagement of the positioning hole (432) with the engagement pin (31) arranged in a predetermined position; and thereafter inserting a bolt (B, B) through a through hole (435a, 436a), and screwing the bolt (B, B) into a bolt hole (131a, 131a), and thereby fixing the inhibitor switch (4) to a transmission case side of an automatic transmission.

According to this configuration, when the jig (3) is attached to the manual shaft (2) with the tooth space (212a) and the engaging projection (341a) conformed in position, in the manner to prevent relative rotation between the jig (3) and the manual shaft (2), wherein the manual shaft (2) is held in the predetermined position for positioning, the engagement pin (31) of the jig (3) is placed always in the same position as viewed along the rotation axis (X). This allows to always set the inhibitor switch (4) in the same angular position in the circumferential direction about the rotation axis (X) with respect to the manual shaft (2) by positioning the inhibitor switch (4, base member 43) by rotating the inhibitor switch (4) about the rotation axis (X) to the position where the positioning hole (432) engages with the engagement pin (31) placed in the predetermined position. This allows to suitably position the inhibitor switch (4) with respect to the manual shaft (2), even when the manual shaft (2) includes the spline teeth (211).

<2> The spline teeth (211) of the outer periphery of the manual shaft (2) form a gear structured to mesh with a gear (G1) rotated by output rotation of a motor (M).

This configuration allows to suitably position and fix the inhibitor switch (4), even when the manual shaft (2) includes the spline teeth (211) instead of the flat part, wherein the spline teeth (211) are structured to be in mesh with a motor-side gear as in an automatic transmission adopting a shift-by-wire system.

<3> The outer periphery of the manual shaft (2) includes two of the tooth spaces (212a, tooth-omitted parts) opposite to each other with respect to the rotation axis (X) as viewed along the rotation axis (X); and the fitting part (33) includes two of the engaging projections (341a, engaging parts) opposite to each other with respect to the rotation axis (X), and structured to engage in the two tooth spaces (212a, tooth-omitted parts).

This configuration allows the fitting hole (34) of the fitting part (33) of the jig (3) to be spline-fitted with the spline teeth (211) of the manual shaft (2) with reference to the two tooth spaces (212a, tooth-omitted parts), and thereby allows the jig (3) to be attached to the manual shaft (2) in the manner to prevent relative rotation therebetween, with the orientation of the jig (3) suitably set.

The configuration including two tooth spaces (212a, tooth-omitted parts) is more advantageous in recognizing the orientation of the jig (3) with respect to the manual shaft (2) than the configuration including the tooth space (212a, tooth-omitted part) as a single one, and therefore allows the jig (3) to be attached easily to the manual shaft (2).

<4> The inhibitor switch (4) includes: a movable member (44) attached to the manual shaft (2) in a manner to prevent relative rotation between the movable member (44) and the manual shaft (2) by flat part fitting, and structured to support a movable contact (443); and a stationary member (43) including the positioning hole (432) and including a plurality of stationary contacts (433) at a surface facing the movable contact (443); the inhibitor switch (4) is structured such that as the manual shaft (2) rotates about the rotation axis (X), the movable contact (443) moves circumferentially about the rotation axis (X) so as to vary a combination of the stationary contacts (433) in contact with the movable contact (443); the manual shaft (2) is placed in an angular position (predetermined position) corresponding to one of selectable ranges (N-range, for example) of an automatic transmission, when the jig (3) is attached to the manual shaft (2) in the manner to prevent relative rotation between the jig (3) and the manual shaft (2); and the angular position (predetermined position) is set such that when the inhibitor switch (4, stationary member 43) is placed in a position allowing engagement of the engagement pin (31) with the positioning hole (432) in the rotation axis (X), the combination of the stationary contacts (433) in contact with the movable contact (443) (the combination of the stationary contacts (433) connected to each other via the movable contact (443)) corresponds to the one of selectable ranges (N-range, for example).

This configuration serves to conform the selected range indicated by the output signal of the inhibitor switch (4) to the actual selected range of the automatic transmission, and thereby suitably allow the inhibitor switch (4) to be attached to the manual shaft (2).

In the present embodiment, the number of the tooth spaces (212a, tooth-omitted parts) of the spline (21) is equal to the number of the engaging projections (341a, engaging parts) of the jig (3). However, the present invention is not limited to this configuration, but may be implemented such that the number of the engaging projections (341a, engaging parts) of the jig (3) is smaller than the number of the tooth spaces (212a, tooth-omitted parts) of the spline (21) as follows.

<5> It includes two of the tooth spaces (212a, tooth-omitted parts) opposite to each other with respect to the rotation axis (X) as viewed along the rotation axis (X); and the fitting part (33) includes the engaging projection (341a, engaging part) as a single engaging part structured to engage in one of the tooth spaces (212a, tooth-omitted parts).

This configuration allows the fitting hole (34) of the fitting part (33) of the jig (3) to be spline-fitted with the spline teeth (211) of the manual shaft (2) with reference to the two tooth spaces (212a, tooth-omitted parts), and thereby allows the jig (3) to be attached to the manual shaft (2) in the manner to prevent relative rotation therebetween, with the orientation of the jig (3) suitably set. In particular, even when the phase of the manual shaft (2) is arranged with a deviation of 180 degrees, the jig (3) is allowed to be attached to the manual shaft (2) in the manner to prevent relative rotation therebetween, with the orientation of the jig (3) suitably set, without correcting the phase of the manual shaft (2).

The invention claimed is:

1. An inhibitor switch positioning method comprising:
    attaching an inhibitor switch to a manual shaft;
    using a jig for positioning the inhibitor switch, wherein the jig includes a fitting part and an engagement pin, wherein: the fitting part is structured to be spline-fitted to an outer periphery of the manual shaft; the engagement pin is structured to engage in a positioning hole formed in the inhibitor switch; and as viewed along a rotation axis of the manual shaft, the outer periphery of the manual shaft includes a tooth-omitted part formed by omitting at least one of a plurality of spline teeth arranged circumferentially at regular intervals, and the fitting part includes an insertion hole for insertion of the manual shaft, wherein the insertion hole includes an inner periphery including a plurality of internal teeth and an engaging part, wherein the internal teeth are structured to mesh with the spline teeth, and wherein the engaging part is structured to engage with the tooth-omitted part;
    attaching the jig to the manual shaft in a manner to prevent relative rotation between the jig and the manual shaft, with the engaging part engaged with the tooth-omitted part; and
    positioning the inhibitor switch by rotating the inhibitor switch about the rotation axis to a position allowing engagement of the positioning hole with the engagement pin arranged in a predetermined position.

2. The inhibitor switch positioning method as claimed in claim 1, wherein the spline teeth of the outer periphery of the manual shaft form a gear structured to mesh with a gear rotated by output rotation of a motor.

3. The inhibitor switch positioning method as claimed in claim 2, wherein:
    the outer periphery of the manual shaft includes two of the tooth-omitted parts opposite to each other with respect to the rotation axis as viewed along the rotation axis; and
    the fitting part includes two of the engaging parts structured to engage with the two tooth-omitted parts.

4. The inhibitor switch positioning method as claimed in claim 2, wherein:
    the outer periphery of the manual shaft includes two of the tooth-omitted parts opposite to each other with respect to the rotation axis as viewed along the rotation axis;
    the fitting part includes the engaging part as a single engaging part structured to engage with one of the tooth-omitted parts; and
    the engagement pin of the jig is set such that the engagement pin is located in the predetermined position when the engaging part engages with one of the tooth-omitted parts.

5. The inhibitor switch positioning method as claimed in claim 2, wherein:
    the inhibitor switch includes:
        a movable member attached to the manual shaft in a manner to prevent relative rotation between the movable member and the manual shaft, and structured to support a movable contact; and
        a stationary member including the positioning hole and including a plurality of stationary contacts at a surface facing the movable contact;
    the inhibitor switch is structured such that as the manual shaft rotates about the rotation axis, the movable contact moves circumferentially about the rotation axis so as to vary a combination of the stationary contacts in contact with the movable contact;
    the manual shaft is placed in an angular position corresponding to one of selectable ranges of an automatic transmission, when the jig is attached to the manual shaft in the manner to prevent relative rotation between the jig and the manual shaft; and the predetermined position is set such that when the stationary member is placed in a position allowing engagement of the engagement pin with the positioning hole, the combination of the stationary contacts in contact with the movable contact corresponds to the one of selectable ranges.

6. The inhibitor switch positioning method as claimed in claim 1, wherein:

the outer periphery of the manual shaft includes two of the tooth-omitted parts opposite to each other with respect to the rotation axis as viewed along the rotation axis; and the fitting part includes two of the engaging parts structured to engage with the two tooth-omitted parts.

7. The inhibitor switch positioning method as claimed in claim 1, wherein:

the outer periphery of the manual shaft includes two of the tooth-omitted parts opposite to each other with respect to the rotation axis as viewed along the rotation axis;

the fitting part includes the engaging part as a single engaging part structured to engage with one of the tooth-omitted parts; and the engagement pin of the jig is set such that the engagement pin is located in the predetermined position when the engaging part engages with one of the tooth-omitted parts.

8. The inhibitor switch positioning method as claimed in claim 1, wherein:

the inhibitor switch includes:
a movable member attached to the manual shaft in a manner to prevent relative rotation between the movable member and the manual shaft, and structured to support a movable contact; and
a stationary member including the positioning hole and including a plurality of stationary contacts at a surface facing the movable contact;

the inhibitor switch is structured such that as the manual shaft rotates about the rotation axis, the movable contact moves circumferentially about the rotation axis so as to vary a combination of the stationary contacts in contact with the movable contact;

the manual shaft is placed in an angular position corresponding to one of selectable ranges of an automatic transmission, when the jig is attached to the manual shaft in the manner to prevent relative rotation between the jig and the manual shaft; and the predetermined position is set such that when the stationary member is placed in a position allowing engagement of the engagement pin with the positioning hole, the combination of the stationary contacts in contact with the movable contact corresponds to the one of selectable ranges.

* * * * *